United States Patent [19]

Almond

[11] 4,269,291
[45] May 26, 1981

[54] VEHICLE DRIVE WITH FREEWHEELING AND BRAKING

[75] Inventor: George Almond, Trumbull, Conn.

[73] Assignee: Empire of Carolina, Inc., New York, N.Y.

[21] Appl. No.: 2,059

[22] Filed: Jan. 9, 1979

[51] Int. Cl.$^3$ .............................................. F16D 67/02
[52] U.S. Cl. ...................................... 192/6 R; 192/14
[58] Field of Search ..................... 192/5, 6 R, 6 B, 14, 192/19, 93, 43

[56] References Cited

U.S. PATENT DOCUMENTS

| | | | |
|---|---|---|---|
| 606,334 | 6/1898 | Downer | 192/6 R |
| 637,178 | 11/1899 | Stem et al. | 192/6 B |
| 643,616 | 2/1900 | Allan et al. | 192/6 R |
| 770,460 | 9/1904 | Glover | 192/6 R |
| 1,381,876 | 6/1921 | Hayward | 192/43 |
| 1,867,938 | 7/1932 | Dalton | 192/43 |
| 2,036,586 | 4/1936 | LePorin | 192/43 |
| 2,138,497 | 11/1938 | Mackowiak | 192/6 B |
| 2,764,270 | 9/1956 | Goul | 192/6 R |
| 2,947,399 | 8/1960 | Moore et al. | 192/93 R |
| 3,843,145 | 10/1974 | Templeton | 192/6 R |

Primary Examiner—George H. Krizmanich
Attorney, Agent, or Firm—Kirschstein, Kirschstein, Ottinger & Cobrin

[57] ABSTRACT

The driving, braking and freewheeling device for tricycles has a simplified structure including a central circular disc driven by a pedal-operated shaft. Cams, symmetrically positioned around the periphery of the central disc, oppose brake shoes which form a segmented ring within the hub of the vehicle's driven wheel. The inner surfaces of the brake shoes are contoured to act as cam followers. Application of torque to the drive shaft in a first direction forces the brake shoes outwardly until engagement is made with an inner surface of the wheel causing the wheel to rotate. When no torque is applied to the drive shaft there is no cam action to force the brake shoes outwardly against the wheel thus permitting the wheel to rotate freely. When the drive shaft is torqued in the opposite direction, the cams force the brake shoes to engage the inner surface in opposition to the rotation of the driven wheel and effect a braking action.

7 Claims, 7 Drawing Figures

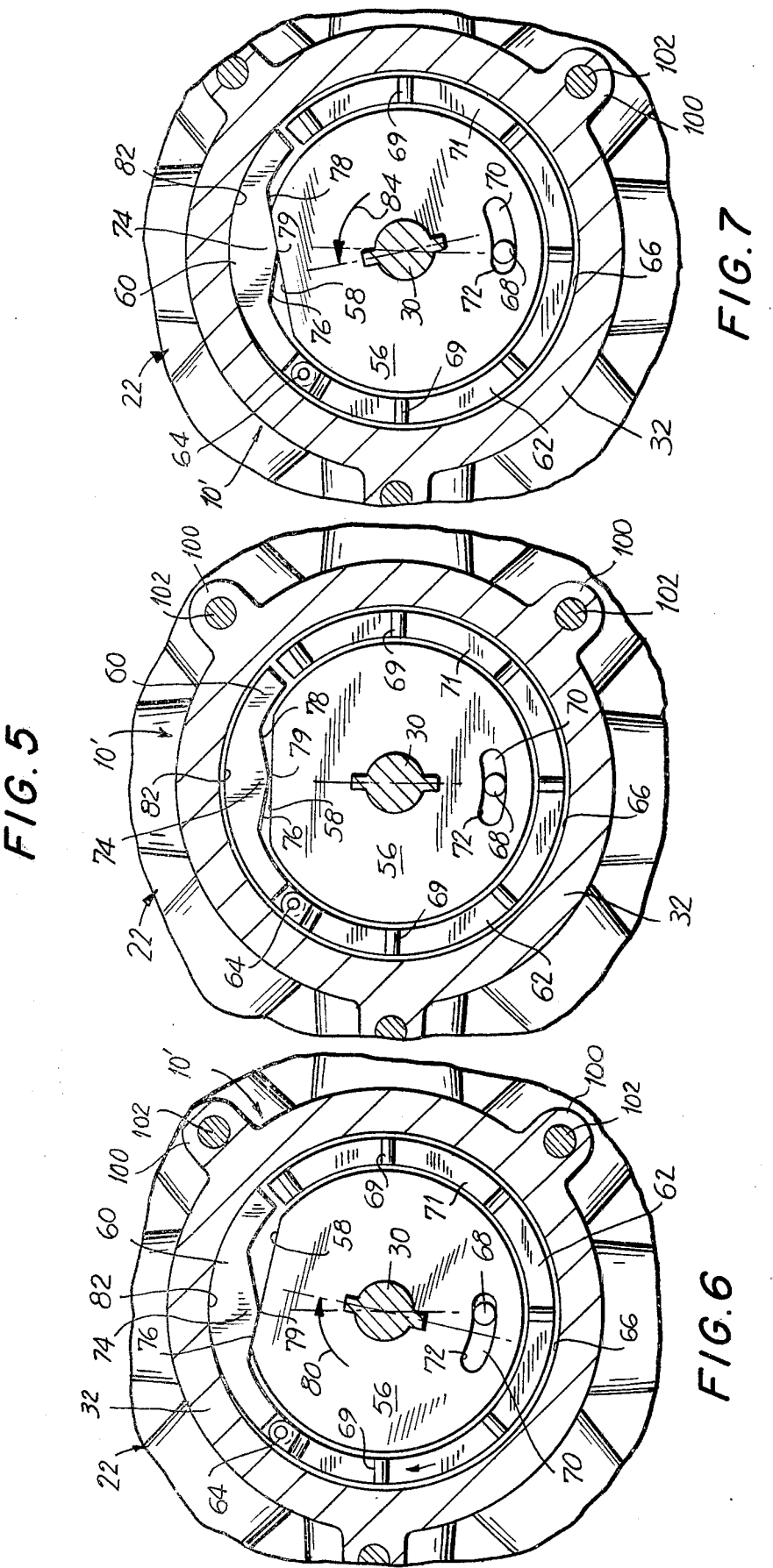

VEHICLE DRIVE WITH FREEWHEELING AND BRAKING

BACKGROUND OF THE INVENTION

This invention relates generally to a pedal drive as used on tricycles for children, and more particularly to a drive which permits, through the action on the pedals of the user's feet, the options of forward motion, freewheeling, or braking action. Pedal operated drives which include the features of freewheeling and braking are common in bicycles built for adults. However, because of the complexity and attendant expense in manufacture of such devices, the features of freewheeling and braking have generally not been available in the tricycles designed for use by children.

What is needed is a drive which is simple in construction and inexpensive in fabrication which includes the features of driving freewheeling and braking.

SUMMARY OF THE INVENTION

Generally speaking, in accordance with the invention, a vehicle drive with driving freewheeling and braking especially suitable for the tricycles of children is provided. The driving, braking and freewheeling device for tricycles has a simplified structure including a central circular disc driven by a pedal-operated drive shaft. Cams, symmetrically positioned around the periphery of the central disc, oppose brake shoes which form a segmented ring within the hub of the vehicle's driven wheel. The inner surfaces of the brake shoes are contoured to act as cam followers. As torque is applied to the drive shaft in a first direction, the cam surfaces force the brake shoes outwardly until they engage an inner surface of the wheel causing the wheel to rotate. When torque is not applied to the drive shaft, there is no cam action forcing the brake shoes outwardly, thereby allowing the wheel to rotate freely without engagement to the drive shaft. When a reversed torque is applied to the drive shaft, the cam faces force the brake shoes to expand and engage the inner surface of the driven wheel and effect a braking action.

In an alternative embodiment of this invention there is a chordal flat surface on the central disc which serves as a cam positioned in opposition to a cam follower affixed to a brake shoe. The brake shoe forms a portion of an annular ring surrounding the central disc. As torque is applied to the drive shaft in a first direction, the flat cam surface forces the brake shoe pivotally outward until it engages an inner surface of the wheel causing the wheel to rotate. When torque is not applied to the drive shaft, there is no cam action forcing the brake shoe outwardly thereby allowing the wheel to rotate freely without engagement to the drive shaft. When a reverse torque is applied to the drive shaft, the cam face forces the brake shoe to pivot and engage the inner surface of the driven wheel and effect a braking action.

Accordingly, it is an object of this invention to provide an improved vehicle drive having both freewheeling and braking capabilities.

Another object of this invention is to provide an improved vehicle drive which is simple in construction and economical in manufacture.

A further object of this invention is to provide a vehicle drive which uses a minimum of moving parts.

Still other objects and advantages of the invention will in part be obvious and will in part be apparent from the specification.

The invention accordingly comprises the features of construction, the combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 5 is a view similar to FIG. 2 of an alternative embodiment of a drive suitable for the vehicle of FIG. 1;

FIG. 6 is the drive of FIG. 5 in forward driving condition and

FIG. 7 is the drive of FIG. 5 in the braking position.

DESCRIPTION OF THE PREFERRED EMBODIMENTS

Figure 1:
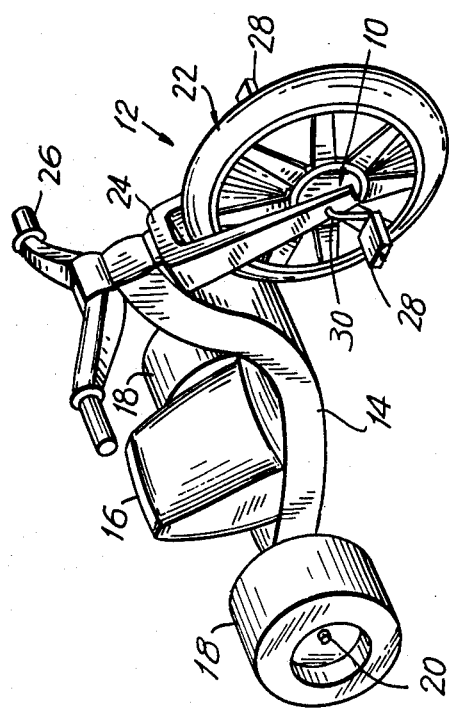
FIG. 1 is a front perspective view of a pedal driven tricycle using the drive of this invention.

With reference to FIG. 1, the drive 10 of this invention is incorporated in a tricycle 12 including a body 14, a seat 16, a pair of rear wheels 18 rotating on a rear axle 20, a front wheel 22, a fork 24, handlebars 26 and pedals 28. The foot pedals 28 connect to the drive 10 by means of the double ended crank shaft 30, all in the conventional manner.

Figure 4:
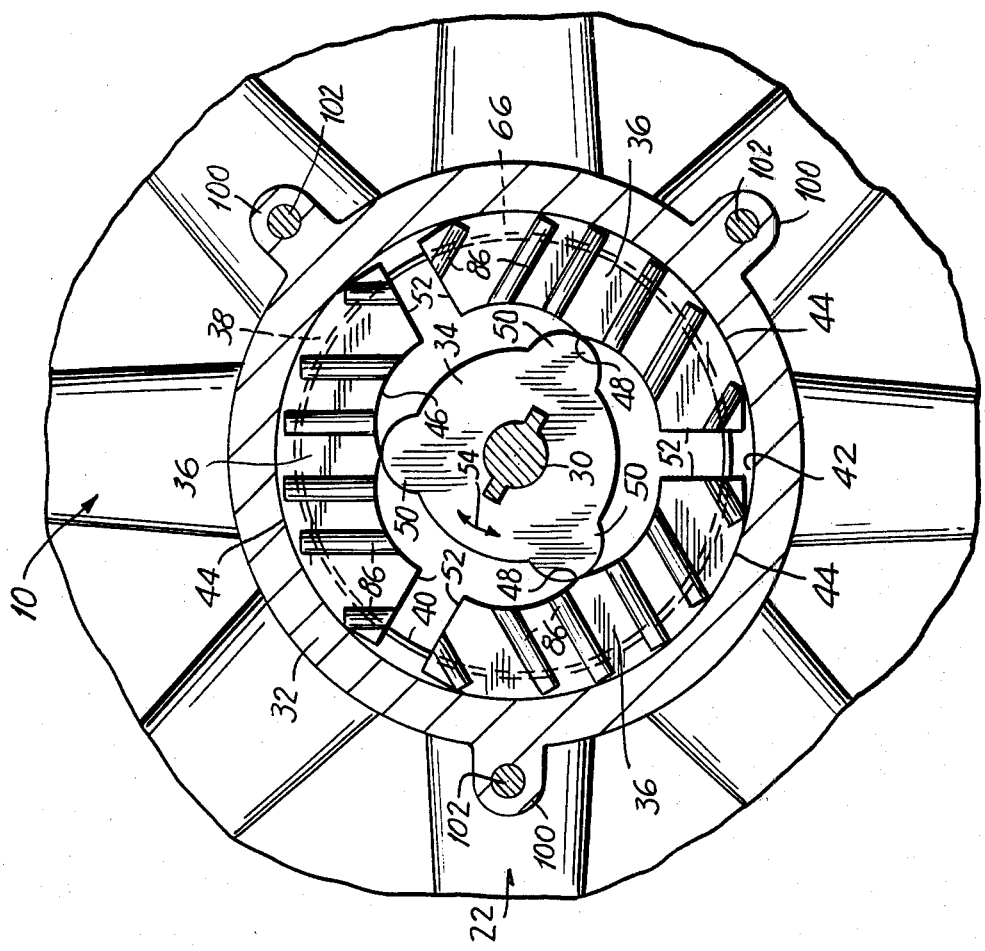
FIG. 4 shows the drive of FIG. 2 with torque applied to the shaft and engagement with the wheel.
Figure 3:
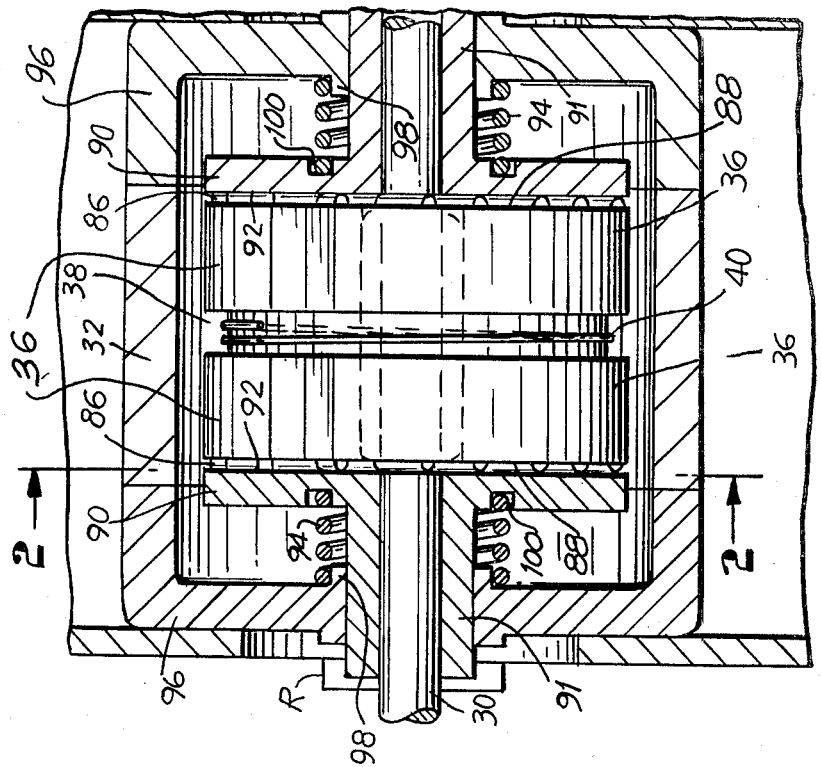
FIG. 3 is an axial sectional view of the drive of FIG. 2.
Figure 2:
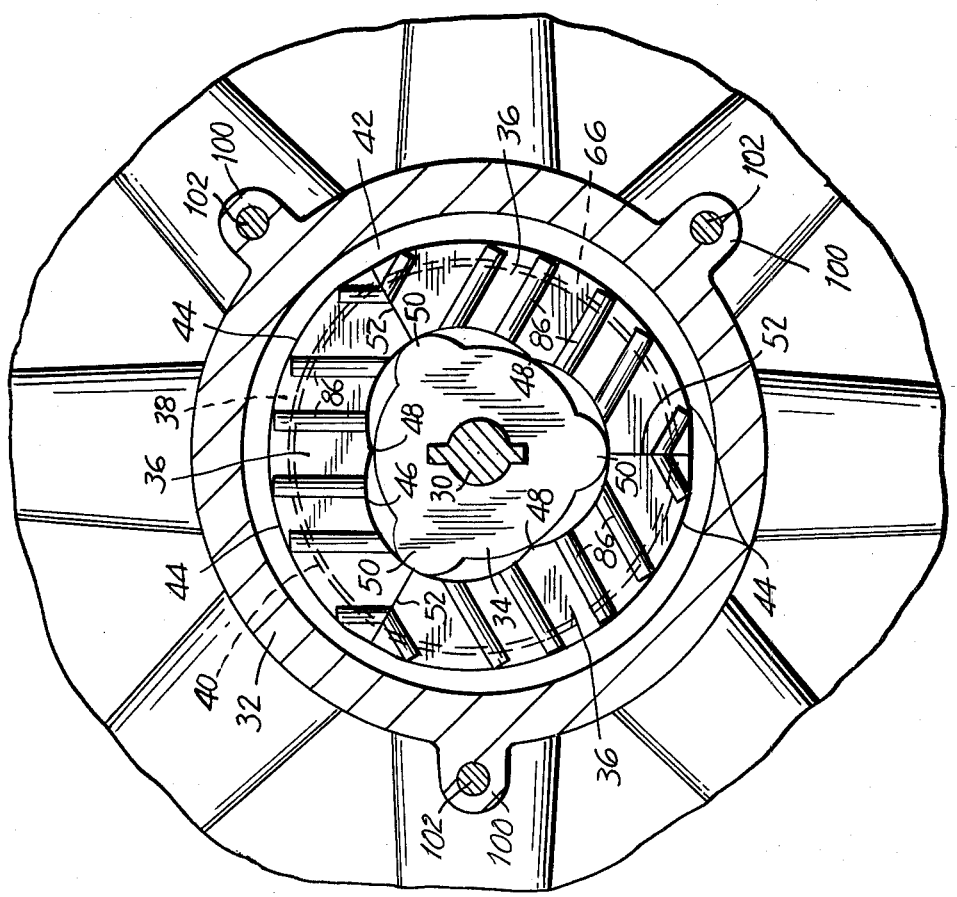
FIG. 2 is a view taken along the line 2—2 of FIG. 3; showing a segment of the wheel of the vehicle of FIG. 1 including the drive mechanism of this invention, the parts being shown in freewheeling position.

As seen in FIGS. 2 through 4, the drive 10 of this invention fits within a chamber C of the central hub 32 of the front wheel 22. The drive 10 includes a circular central disc 34 rigidly mounted to the shaft 30 for rotation therewith. Three brake shoes 36 are abutted at their ends to form a segmented ring within the wheel hub 32. A circumferential channel 38 (see FIGS. 2, 3 and 4) is recessed into the periphery of the ring made up of the three circular segmental brake shoes 36. A coil spring 40 rests within the channel 38 and biases the three brake shoes 36 into said abutting contact of their adjacent ends, one with the other. In this abutting condition, there is a radial clearance 42 between the outer surfaces 44 of the brake shoes 36 and the inner surface of the central hub 32 of the wheel 22 so that the wheel can rotate freely with respect to the shaft 30. Whereas the outer surface 44 of each shoe 36 is circular, the inner surface 46 of each shoe is contoured to provide a cusp 48 at the center of each shoe 36. In other words, the inner surface 46 of the shoe 36 is comprised of two intersecting arcs and the cusp 48 acts as the high point of a cam follower as described hereinafter.

The central disc 34 is rigidly attached to the crank shaft 30. Three semi-circular cams, i.e. lobes 50 are symmetrically positioned around the periphery of the central disc 34. As seen in FIG. 2, when the cams 50 are opposed to the abutment lines 52 between the brake shoes 36, the coil spring 40 biases the brake shoes 36 together and the radial clearance 42 between the brake shoes 36 and the central hub 32 is maintained to allow freewheeling of the tricycle.

A plurality of generally radial bosses 86 extend from the lateral surfaces 88 of the brake shoes 36. The bosses 86 are frictionally axially engaged by the circular pressure plate 90 which is urged against the bosses 86 by the compression spring 94. The tops of the bosses 86 engaging the generally planar rubbing surface 92 of the pressure plate 90, provide a preferential degree of friction. A greater friction is produced to oppose rotational motion of the brake shoes 36 relative to the pressure plate 90 than is produced to oppose radial motion of the brake shoes 36 relative to the pressure plate 90 due to the bosses' 86 orientation.

An extended collar 91 extends from the pressure plate 90 and is rotatedly mounted to the crank shaft 30. The cup-shaped drive housing 96 encloses the drive mechanism on one side and is fixedly attached to the wheel 22 by radially extended tabs 100 and fasteners 102, e.g. screws, which pass through the tabs 100 and engage the wheel 22. The flanges 98 of the drive rotateably engage the outer surface of the collar 91 and prevent entrance of foreign matter to the drive mechanism. The compression spring 94 is retained between the pressure plate 90 and the drive housing 96 and is aligned by the flange 98 at one end and by the annular channel 101 in the pressure plate 90 at the other end.

It should be understood that the drive mechanism is symmetrical and housings 96, springs 94 and pressure plates 90 with collars 91 are used in a similar manner on both sides of the drive. When a torque is applied in either direction as indicated by the double-headed arrow 54 in FIG. 4, the central disc 34 with the cams 50 rotates until the cams 50 rest against the cusps 48 of the brake shoes 36. Friction of the pressure plate 90 (held stationary by a retainer R) against the side bosses 86 of the brake shoes 36 prevents rotation of the brake shoes 36 prior to engagement of the brake shoes with the hub 32. The pressure contact of the cams 50 against the shoes 36 forces the brake shoes 36 apart against the bias of the spring 40 until the outer surfaces 44 of the brake shoes 36 frictionally contact the inner surface of the wheel hub 32 causing the wheel 22 to rotate in the forward direction when a forward directional torque is applied, and to provide a reverse friction on the wheel hub 32 for braking when a reverse torque is applied. When the torque on the crank shaft 30 is removed, the central disc 34 with cams 50 will move automatically to a position relative to the brake shoes 36 where the cams 50 are once again opposed to the abutment lines 52, and the spring 40 draws the shoes 36 once again into abutment. In this abutting condition, the spaced clearance 42 is again opened and the wheel is in condition for free rotation. Accordingly forward motion can be transmitted to the wheel 22 by the application of forward torque to the crank shaft 30. Braking can be applied to the wheel 22 by the application of a reverse torque to the crank shaft 30, and when no torque is applied to the crank shaft 30, a freewheeling condition is provided for the wheel 22.

FIGS. 5 through 7 illustrate an alternative embodiment of this invention wherein a circular central disc 56 is rigidly mounted to the shaft 30 for rotation therewith. The circular disc 56 has a chordal flat surface 58 which serves as a cam. Circular disc 56 fits substantially concentrically within an annular ring comprised of the brake shoe 60 and an annular ring element 62. The brake shoe 60 is pivotally connected at one end to the annular ring element 62 whereby the outer periphery of the combined brake shoe 60 and ring element 62 substantially form an annulus which fits concentrically within the central hub of the wheel 22. The other end of the brake shoe 60 is free. The brake shoe 60 pivots about the pin 64. An annular space 66 is present between the brake shoe 60 and the inner surface of the central wheel hub 32 when the shaft 30 is not driven as explained more fully hereinafter.

The pivot pin 64 and a stop pin 68 mount to a common base 70. The stop pin 68 moves within the arched slot 72 and assures concentricity between the brake shoe 60 and ring element 62 and the central disc 56. The stop pin 68 also limits the angular rotation of the central disc 56 relative to the base 70 and the brake shoe 60.

A cam follower 74, integral with the brake shoe 60, and extending radially inward from the inner periphery thereof, extends to a position adjacent to the flat chordal surface 58. The cam follower 74 is symmetrical, and includes a pair of intersecting flat surfaces 76, 78. When the flat surfaces 76, 78 are symmetrically positioned relative to the flat chordal surface 58, the point 79 of farthest extension on the cam follower 74 is directly opposed to the midpoint of the chordal flat surface 58. As best seen in FIG. 5, in this condition of symmetrical positioning between the brake shoe 60 and the central disc 56, there is a clearance 66 which entirely separates the wheel hub 32 from the drive. In such a condition the wheel 22 is able to rotate freely in either direction without any interference from the shoe 60.

As seen in FIG. 6, when a clockwise torque, as indicated by the arrow 80, is applied to the shaft 30 to produce motion of the tricycle 12 in the forward direction, the central disc 56 rotates relative to the brake shoe 60 until the chordal cam surface 58 rests against the flat cam follower surface 76, causing the brake shoe 60 to pivot counterclockwise about the pin 64. In so doing, the brake shoe outer surface 82 makes frictional contact with the inner surface of the central hub 32. The hub, and with the hub the entire wheel 22, rotates in unison with the shaft 30 to give forward motion to the tricycle 12.

As seen in FIG. 7, when a counterclockwise torque is applied to the central disc 56 via the shaft 30, the central disc 56 rotates counterclockwise as indicated by the arrow 84 until the flat chordal surface 58 of the central disc 56 rests against the flat cam follower surface 78 on the brake shoe 60. This causes the brake shoe 60 to pivot about the pin 64 until contact is made between the outer surface 82 of the brake shoe 60 and the inner surface of the central hub 32. When the tricycle is moving in the forward direction, this reversed torque indicated by the arrow 84 causes friction between the brake shoe 60 and the wheel hub 32 whereby forward motion is retarded and the tricycle is braked. It should be understood that when the tricycle is not in motion such reverse torque, as indicated by the arrow 84, can cause reverse motion of the tricycle unless means (not shown) is provided to prevent backward motion of the vehicle.

Accordingly, it can be seen that when no torque is applied to the shaft 30, there will be no engagement between the brake shoe 60 and annular ring element 62 and the wheel hub 32. This provides a freewheeling condition for the tricycle. When a clockwise (FIG. 6) torque is applied to the crank shaft 30, then the brake shoe 60 engages the hub 32 to produce forward motion on the tricycle, and when a reverse torque 84 is applied to the crank shaft 30, the brake shoe 60 frictionally contacts the wheel hub 32 to provide braking of the tricycle.

It should be understood that the hub housings, springs and pressure plates (not shown) of similar design and function as the housings 96, springs 94 and pressure plates 90 in the embodiment of FIGS. 2, 3 and 4, are also provided in the alternative embodiment of FIGS. 5, 6 and 7. The pressure plates (not shown) engage the bosses 69 on the side surfaces 71 of the annular ring element 62 to prevent rotation of the ring element 62 and brake shoe 60 until the brake shoe 60 has engaged the central hub 32. A biasing spring (not shown) returns the pivotable brake shoe 60 to the withdrawn condition when the vehicle is freewheeling without rotation of the pedals.

Also in an alternative embodiment of this invention, a replaceable lining, rigidly attached to the wheel, is used within the hub to engage the brake shoes of the drive. Thereby the useful life of the vehicle is extended.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a vehicle having a driven wheel, said driven wheel having a central hub within which there is mean providing a hollow circular chamber concentric with the wheel, a drive comprising:
   (A) a disc in said chamber oriented in a plane parallel to that of the wheel,
   (B) means mounting said disc for orientation relative to the chamber about an axis coincident with the axis of the wheel,
   (C) a ring of brake shoes around the disc,
      (i) said brake shoes having outer surfaces facing the circular inner surface of the chamber,
      (ii) said brake shoes having inner surfaces facing the outer surface of the disc,
      (iii) said brake shoes being shiftable toward and away from the center of the disc,
   (D) spring means urging said brake shoes toward the center of the disc,
   (E) the ends of the brake shoes approaching abutting end-to-end relationship as they move toward the center of the disc,
   (i) the ends of the brake shoes moving apart as the brake shoes move toward the inner surface of the hollow chamber,
   (F) cams on the disc,
   (G) a cam follower on said brake shoe for cooperation with said cam,
   (H) said ring of brake shoes and said disc being angularly movable relative to one another about the axis of the wheel between a first position in which the cam and cam follower are so relatively angularly oriented as to permit the brake shoes to be moved inwardly, thereby leaving clearance between the outer surface of the brake shoes and the cylindrical inner surface of the hollow chamber, and a second position in which the cam and cam follower are so relatively angularly oriented as to shift the brake shoes away from the center of the disc and against the cylindrical inner surface of the hollow chamber,
   (J) means to drivingly rotate the disc,
   (K) whereby said wheel is rotatably driven when said disc is rotated and said wheel is free of said brake shoe for freewheeling rotation when said disc is stationary,
   the improvement comprising;
   (I) friction drag members,
   (II) means mounting said friction drag members on opposite sides of said brake shoes, said brake shoes being rotatable as a ring relative to said friction drag members, and
   (III) spring means separately urging each of said drag members against opposite sides of said brake shoes.

2. The drive of claim 1 wherein the facing surfaces of the friction drag members and brake shoes create a greater friction to oppose rotational movement of the brake shoes relative to said members than is produced to oppose motion of the brake shoes toward the cylindrical surface of the hollow chamber relative to the disc.

3. The drive of claim 2 wherein the surfaces of the brake shoes facing the drag members constitute for each brake shoe plural parallel bosses extending in a direction parallel to a line drawn from the center of the disc radially outwardly through the center of the brake shoe.

4. The drive of claim 1 wherein the brake shoes, when abutted end to end, form a circular ring.

5. The drive of claim 4 wherein the brake shoes have a circumferential groove which contains the spring means urging the brake shoes toward the disc.

6. The drive of claim 1 wherein each brake shoe has a cam follower and the disc is provided with a different cam for each cam follower.

7. The drive of claim 1 wherein the disc is circular, the cam is a flat chordal surface on said disc, and the cam follower includes at least one flat surface on a brake shoe for engagement with the chordal surface.

* * * * *